United States Patent
Doolittle et al.

[19]

[11] 3,852,708

[45] Dec. 3, 1974

[54] MULTIPLE ELEMENT PHASED ARRAY WITH SHADED SUB-ELEMENT GROUPS

[75] Inventors: Richard D. Doolittle, Washington, D.C.; John A. Dorr, Crofton, Md.

[73] Assignee: Chesapeake Instrument Corporation, Shady Side, Md.

[22] Filed: Jan. 24, 1972

[21] Appl. No.: 219,939

[52] U.S. Cl............ 340/7 R, 340/6 R, 340/15.5 CP
[51] Int. Cl............................................... G01v 1/38
[58] Field of Search.................. 340/7 R, 6, 15.5 CP

[56] References Cited
UNITED STATES PATENTS

| | | | |
|---|---|---|---|
| 3,364,461 | 1/1968 | Trott | 340/6 |
| 3,441,902 | 4/1969 | Savit | 340/7 R |

OTHER PUBLICATIONS

Schoenberger, "Optimal Drive . . . Sensitivity Constraints," 1969, SEG Convention, pp. 139–144.
Savit et al., "The Moveout Filter," 1/58, pp. 1–25, Geophysics, Vol. XXIII.
Parr et al., "A New Method of Pattern Shooting," 7/55, pp. 539–564, Geophysics XX, No. 3.

*Primary Examiner*—Richard A. Farley
*Assistant Examiner*—N. Moskowitz
*Attorney, Agent, or Firm*—Cushman, Darby & Cushman

[57] ABSTRACT

An array of grouped transducer elements (i.e., groups of sub-elements with each group connected together in parallel to act as a single array element) is disclosed for use in a towed hydrophone array where the wavelength of unwanted noise signals has been discovered to be much shorter than the wavelength of signals for which a response is desired. In such a towed array, each group of sub-elements itself acts as an array with respect to the shorter wave length tow noise signals and improved performance of the overall (i.e., greater signal-to-noise ratio) composite array of elements is achieved by shading individual groups of sub-elements to minimize their responses to the unwanted noise signals. The exemplary embodiment is directed to a linear towed array of hydrophones intended for use in liquid mediums. When such an array is towed through the liquid medium, it has been discovered that so-called "tow noise" is generated and propagated mechanically along the physical structure of the array at a relatively low velocity whereas the acoustic waves travelling in the liquid medium (for which a response is actually desired) travel at a much higher velocity and therefore have a correspondingly greater wavelength. Thus, a single group of sub-element hydrophones connected together may act as only a single element with respect to the longer wavelength acoustic waves of interest while at the same time the group will act as an array with respect to the tow noise propagating axially along the towed linear array. Accordingly, each group of transducers is shaded either by physical spacing and/or by proportioned hydrophone sensitivities etc., to result in minimizing the end-fire responses of the groups for the unwanted tow noise signal.

19 Claims, 5 Drawing Figures

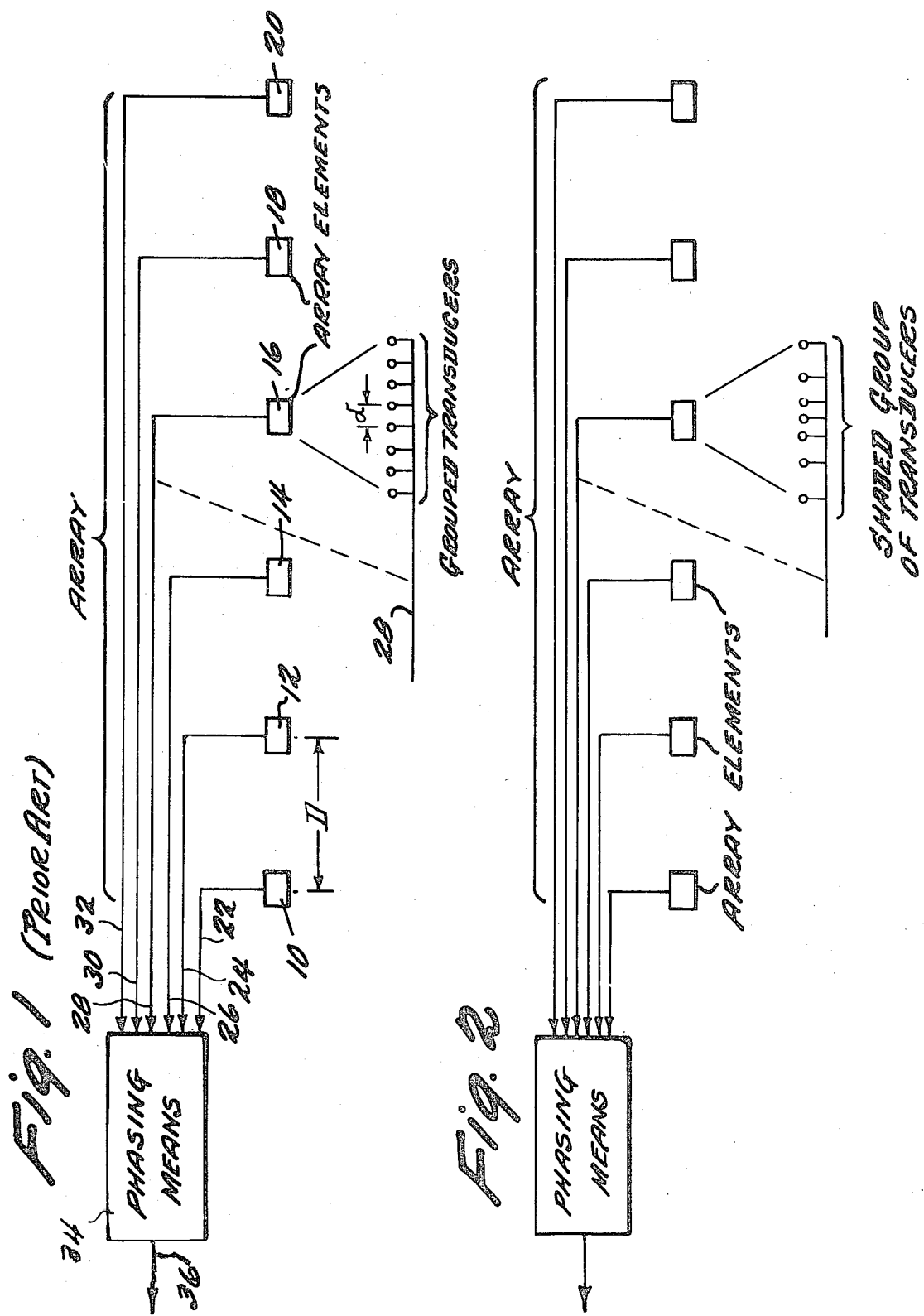

MULTIPLE ELEMENT PHASED ARRAY WITH SHADED SUB-ELEMENT GROUPS

This invention generally relates to a multiple element phased array of hydrophone transducers adapted for towing in a liquid medium for detecting acoustic waves therein. Of course, it also relates to any other form of transducing elements that may be used in such arrays.

The general theory of multiple element transducer arrays is well-known wherein the output from each of several spaced-apart elements in the array are individually processed in a predetermined phase relationship to produce a composite response for the entire array having predetermined response characteristics with respect to frequency and spacial orientation of received and/or transmitted signals.

To operate effectively as a phased array, each element of the array must be of relatively small dimensions when compared to a wavelength of the propagating signals for which a response is desired. However, when the wavelengths are quite long (as is the case, for instance, in a liquid medium with acoustic waves) an individual element of a phased array may in fact comprise a plurality of individual transducers. For instance, a plurality of such transducers may be used to increase the effective sensitivity of a single array element beyond that obtainable from a single transducer and/or for other reasons.

Towed hydrophone arrays comprise hydrophones enclosed within a flexible elastic sheath along with means such as preamplifiers, encoders and multiplexers to transmit the sensed acoustic energy over a tow cable to a receiver aboard the tow ship. Several noise components interfere with the detection of signals of interest; some of the interfering noise components are ambient noise, tow-ship generated noise, electronic noise, and hydromechanical noise that is generated by relative motion between array/cable and the water.

Several arrays have been built with more than one hydrophone employed as an array element (i.e., hydrophone channel). A plurality of identical hydrophones are placed in the array with constant spacing: each successive hydrophone is placed at a fixed distance from the preceding hydrophone. All hydrophones comprising an array element (hydrophone group) are electrically connected together (normally in parallel) and feed a single preamplifier or telemetry channel.

The hydromechanical noise level out of a group is measurably less than the level out of a single hydrophone and heretofore, the improvement in hydromechanical noise level was thought to vary as $$N_G = N_H - K \log n \text{ (in decibels)}$$

where
$N_G$ is the group level
$N_H$ is the hydrophone level
$K$ is a factor dependent upon the fixed spacing
and
$n$ is the number of hydrophones in the group.

Experimentally, it was determined that increasing the spacing beyond about 16 inches yielded little or no increase in the factor $K$. Hence, noise improvement means was limited to increasing $n$, the number of hydrophones in the group, and practically realizable improvement was consequently limited by group apertures that provided essentially omnidirectional response at the upper acoustic frequency of interest.

Thus, in the past, such grouped hydrophone transducers in an array of such groupings have been spaced approximately equally. However, we have discovered that in certain environments, such groups of transducers should actually be shaded to minimize responses to unwanted signals since the group of transducers may in itself constitute an array with respect to such unwanted noise signals.

Hydromechanical noise has two significant components: a coherent component and an incoherent component. The coherent noise is generated primarily by tow cable vibrations and array end effects, and travels longitudinally along the array with velocities that are less than acoustic velocities. Hence, in this invention, each hydrophone group is considered as being analogous to an array operating in a low-propagation-velocity medium with interfering noise being rejected by the end-fire response of the array. Incoherent noise rejection is equal to 10 log $n$ in decibels as previously discussed.

Subsequent investigations have indicated that the velocities of coherent hydromechanical noise propagation in some towed arrays (e.g. those manufactured by the Chesapeake Instrument Corporation) are less than 300 feet per second. On the other hand noise propagation velocities in other types of towed arrays that contain internal strength members probably extend above 1,000 feet per second; and consequently the interfering noise wavelengths are longer and the group aperture is less effective in rejecting the coherent component of the hydromechanical noise.

The relative levels of the coherent and incoherent components are such that the coherent noise component is predominant at frequencies near the tow cable strumming frequency and the incoherent component becomes higher at upper frequencies where the noise is thought to be generated by turbulence. In consequence, it has been discovered that the predominant low-frequency coherent noise can be rejected with high efficiency by shading the group aperture.

Shading can be accomplished in two ways:

1. By adjusting the hydrophone sensitivities in the method, for example, of Dolph-Tchebysheff as descrbed in "Current Distribution for Broadside Arrays;" C. L. Dolph; Proceedings of the I.R.E. and Wave Electronics, June 1946 (p. 335).

2. By adjusting the spacing of the hydrophones in the group in the method, for example, of Ishimaru "Theory of Unequally-Spaced Arrays;" Akira Ishimaru; I.R.E. Transactions on Antenna and Propagation, Nov. 1962, p. 691.

Practical manufacturing considerations indicate that the second shading method is preferable. The method of Ishimaru yields end-fire lobes that approach the design level at low frequencies and are gradually degraded as frequency is increased. Consequently, the method can provide greatest rejection at the frequencies of highest coherent hydromechanical noise.

Thus, this invention involves the shading of hydrophone groups within linear arrays that experience intefering, low-propagation-velocity, longitudinally-propagated noise. Accordingly, the invention is not limited to towed arrays only, since the technique is also applicable to suspended-fixed linear arrays of hydrophones where a coherent noise component may be generated by other means than a tow cable.

Other objects and advantages of this invention will become apparent after reading the following detailed description in conjunction with the accompanying drawings, of which:

FIG. 1 is a schematic portrayal of previous multiple element phased arrays with sub-element groups;

FIG. 2 is schematic depiction similar to FIG. 1 except that the sub-element groups have now been shaded to minimize unwanted noise responses according to the teachings of this invention;

Figure 3:
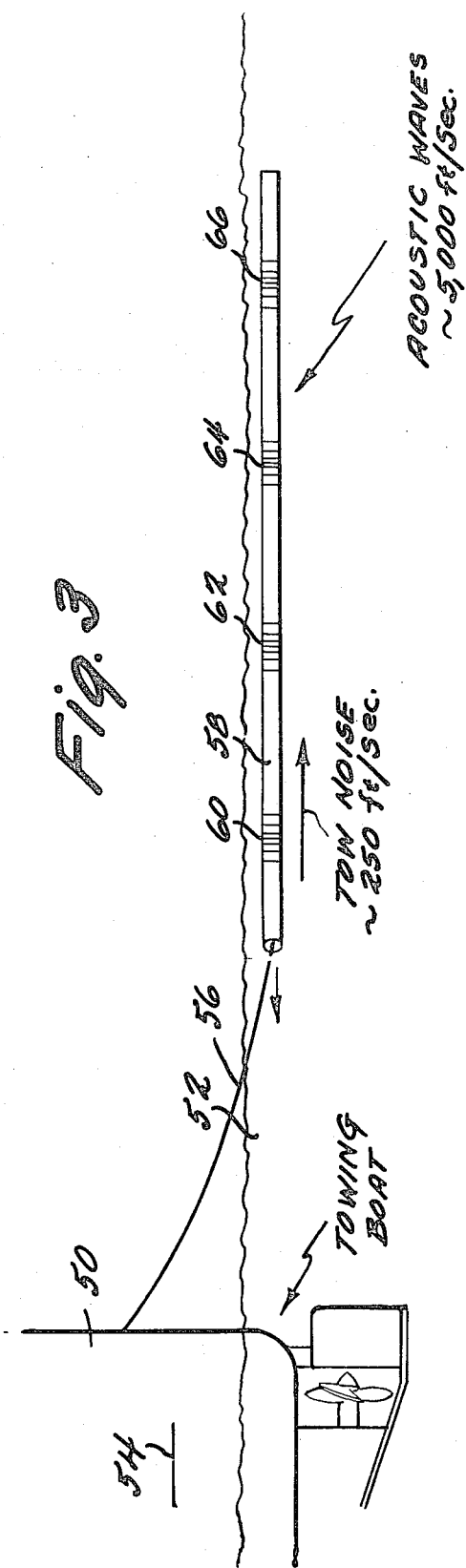
FIG. 3 depicts an exemplary embodiment of this invention including a towed array of hydrophones wherein groups of hydrophones acting as individual elements of the array are shaded according to the teachings of this invention.

Referring to FIG. 1, an array of elements 10, 12, 14, 16, 18 and 20 is schematically depicted with telemetry lines 22, 24, 26, 28, 30 and 32 respectively connected to some form of conventional phasing means 34 which combines the outputs from the array elements with predetermined phasal relationship therebetween to provide a composite output at 36. As will be appreciated by those in the art, by properly adjusting the phasing means 34, the frequency range and sensitivity of the overall array of elements to received/transmitted signals at any given orientation with respect to the array may be properly selected.

As shown in FIG. 1, the elements of the overall array are spaced apart by a distance D which may or may not be constant depending upon the particular design of the overall array.

FIG. 1 also depicts an exploded view of array element 16 (all other elements identical) showing grouped transducers spaced apart by equal distances $d$. The outputs from the individual transducers are combined (for instance by connecting them together in parallel) to provide a composite signal on telemetry line 28. In the past, such grouped transducers have been spaced equally and all transducers have had approximately equal sensitivity.

While the grouped transducers 16 act as a single element with respect to signals for which the combined spaces $d$ in one group is small compared to a wavelength of a propagating signal, for other signals having much shorter wavelengths or the same order of magnitude as the space $d$, the element 16 of grouped transducers will itself act as an array.

In some environments, such as towed linear arrays of hydrophones, the coherent noise signal component has an effective wavelength much shorter than the wavelength of acoustic signals for which a response is actually desired. For instance, we have discovered that tow noise in a towed linear array of hydrophones propagates longitudinally down some towed array structures at approximately 250 feet per second while acoustic signals for which a response is desired actually travel at about 20 times that velocity or approximately 5,000 feet per second. As can be seen, for signals of a given frequency the wavelength for the tow noise will actually be 20 times smaller than the wavelengths for the signals of interest. Accordingly, while the space $d$ between the individual transducers in one group would normally be small with respect to the wavelength of the signals of interest, the spacing $d$ can easily be significant when compared with the wavelength of the low velocity low noise signals.

Accordingly, as shown in FIG. 2, this invention provides an improved array with reduced response to such tow noise or other unwanted signals which have short wavelengths compared to the signals of interest by treating each group of transducers as an array in and of itself with respect to the low velocity noise signals. More particularly, the transducer elements in each group are shaded according to known techniques (as previously referenced) to minimize the response of the group to the unwanted noise signals. In the case of tow noise propagating longitudinally down the axis of a towed linear hydrophone array, each group of hydrophone transducers is shaded to minimize its end-fire response to the unwanted noise signals.

Figure 4:
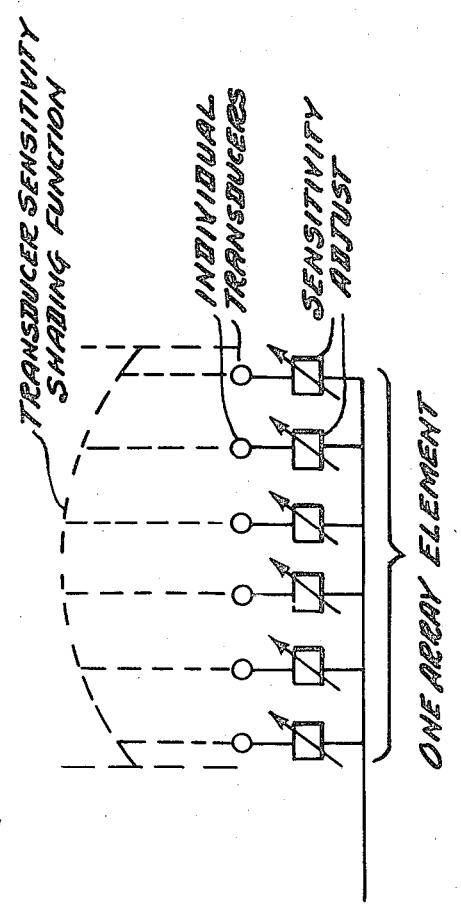
FIG. 4 is a schematic illustration of a single group of transducers that has been shaded by effecting different transducer sensitivities.

The shading of the group transducers may be accomplished by any conventional technique as for instance the well-known techniques of variable spacing (Ishimaru technique) as shown in FIG. 2 or of variable transducer sensitivites (Dolph technique) as depicted in FIG. 4.

In FIG. 3 a towing boat 50 is proceding in a liquid medium such as the ocean 52 in the direction of arrow 54. A tow cable 56 attached to the stern of the boat tows a linear hydrophone array 58 through the liquid medium. Such hydrophone arrays are often used when listening for underwater acoustic waves such as in submarine detection, etc. Each individual group of hydrophones 60, 62, 64 and 66 is shaded according to the techniques shown in FIG. 2 or FIG. 4 or any other technique and the outputs thereof are then combined and fed through cables (the outputs may be digitized, etc. according to known techniques and in accordance with standard practice) and the individual outputs are then passed through electrical telemetry conductors in cable 56 into utilizing circuitry such as the phasing means, etc. on board the towing boat 50 for utilization as will be apparent to those in the art.

The aperture length of the space-shaded group should be at least one wavelength at the lowest frequency of interest. For example, if 10 Hz is the lowest frequency of interest, the aperture length should be $$L \geq V/10$$

where $V$ is the velocity of the propagation in the array sheath or hose and is characteristically less than 300 fps in many arrays.

Figure 5:
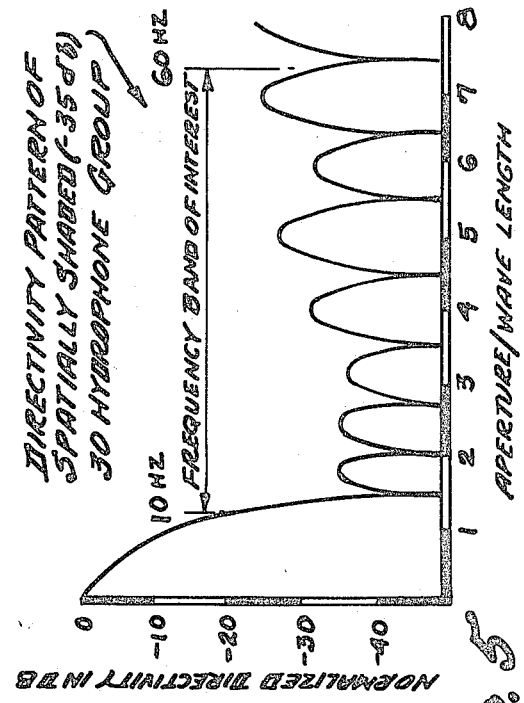
FIG. 5 is a graph utilized in explaining the exemplary embodiment of this invention.

The number of hydrophones in the group and the accuracy with which they are placed in the group determine the response of the group to higher frequencies. For example, the plot of equation 4a from the following description of a method for determining the hydrophone position is presented in FIG. 5. The plot represents the end-fire response of a spatially shaded group of 30 hydrophones that have been positioned with an accuracy of one part in a thousand. The aperture length was selected to be 1.2 times the wavelength at 10 Hz. Note that the lobe responses in FIG. 5 tend to increase from the first lobe level as frequency is increased. If the hydrophones had been positioned with greater accuracy or if more hydrophones had been used, the rise in lobe level with increasing frequency would be less pronounced. The rise in lobe level can only be predicted on a statistical basis, and is not discussed herein.

The directivity pattern is applicable to any aperture length as long as the geometry is maintained. For example, if the aperture were selected to be 1.5 wavelengths at 10 Hz ($L \approx 45$ ft), the 10Hz response would be at the first null, and the 60 Hz response would be at Aperture/Wavelength = 9.

The method of shading by the Ishimaru technique involves obtaining the inverse of a function relating the position of a hydrophone within the aperture or length of a group, its "position function" to its generalized number or "number function." As explained by Ishimaru, the position function has value zero at the center of the group and a value $\pm a$ at the ends with the positive value taken to the right. Thus $a$ is one-half the total group length. The normalized position function $x(y)$ then has the value range $-1 < x < +1$ and the normalized number function $y = y(x)$ has the value range $-1 < y < +1$. It is important to note that the two functions are inverses of each other. Thus the actual position of the $n$ th hydrophone element is $S_n = ay(x_n)$ and the problem is to obtain a set of $S_n$ values by solving for $x$ as a function of $y$ and substituting in a set of $y_n$ values. This is done by first transforming the directivity pattern of the array and then noticing the relationship between the coefficients of the transformed series.

The directivity pattern of a line array of $N$ hydrophones is given by (1)
$$E(\theta) = \sum_{n=1}^{N} A_n e^{iS_n \sin \theta}$$

where $A_n$ is the relative sensitivity of the $n$ th hydrophone, and $\theta =$ the bearing angle relative to broadside.

This finite series is transformed by the use of Poisson's sum formula. Without going through the process step by step, since it is fully explained by Ishimaru and since it is not essential to the discussion, the resulting expression for a Taylor shaded group is (2)
$$y(x) = x + Z \sum_{q=1}^{Q} A_2 \sin q\pi x / q\pi$$

where $Q$ and the $A_q$ values are chosen to produce a given sidelobe to main lobe height ratio (shading level).

For convenience in applying the method $Q = 4$ and the $A_q 3$ s are tabulated below:

| Shading level (db) | 25 | 30 | 35 |
|---|---|---|---|
| $A_0$ | 1.0 | 1.0 | 1.0 |
| $A_1$ | $-0.22974$ | 0.32086 | 0.40462 |
| $A_2$ | $-0.00537$ | $-0.01823$ | $-0.01993$ |
| $A_3$ | $-0.00662$ | 0.00144 | 0.00505 |
| $A_4$ | 0.0049 | 0.00112 | $-0.00094$ |

It must be noted that the directivity patterns computed with these coefficients are one-term approximations to an infinite series and thus the maximum shading level obtainable is about 35 $db$. This is not a limitation on the method, however, since other terms may be added to the series at the cost of increased complexity in the computations.

Since we really require $X$ as a function of $Y$, the inverse of equation (2) must be solved. Again avoiding the complexity of a general solution for the inverse, a computer is used to interpolate between closely spaced values of $Y$ as a function of $X$. The $Y_n$ for a given value of $N$ are computed from the formula (for $N$ even)

$$Y_n = 2n - 1/N \quad n = 1, 2, \ldots N/2$$

(3a)

and for $N$ odd, $$Y_n = 2n/N$$

(3b)

These values of $Y_n$ then produce corresponding values of $X_n$, and thus of $S_n$, the actual positions of the hydrophones within the group. Directivity patterns can then be computed using the formulas for $N$ even (4a)
$$E(u) = \frac{1}{M} \sum_{n=1}^{M} \cos U x_n$$

where $N = 2M$ and for $N$ odd as (4b)
$$E(u) = \frac{1}{2M+1} \left( 1 + 2 \sum_{n=1}^{M} \cos U x_n \right)$$

where
$N = 2M + 1$ and for both formulas
$U = ka \sin \theta$
with $k$ the wave vector
where $k$ is related to the wavelength ($\lambda$) by the formula $$k = 2\pi/\lambda$$

As an example of this design technique, assume it is desired to design a group using 30 hydrophone elements to obtain a 35 db shading level. Thus the following table is formed with columns 2 and 3 taken from Equation 3a, and column 4 being obtained by linear interpolation.

| 1 | 2 | 3 | 4 | | 5 |
|---|---|---|---|---|---|
| M | $Y_m$ | $Y_m$ | $X_n$ | $\pm$ | $S_n/a$ |
| 1 | 1/N | .0333 | .013 | $\pm$ | .013 |
| 2 | 3/N | .100 | .057 | | .057 |
| 3 | 5/N | .167 | .094 | | .094 |
| 4 | 7/N | .237 | .135 | | .135 |
| 5 | 9/N | .300 | .172 | | .172 |
| 6 | 11/N | .367 | .212 | | .212 |
| 7 | 13/N | .433 | .254 | | .254 |
| 8 | 15/N | .500 | .298 | | .298 |
| 9 | 17/N | .567 | .345 | | .345 |
| 10 | 19/N | .633 | .394 | | .394 |
| 11 | 21/N | .700 | .448 | | .448 |
| 12 | 23/N | .767 | .510 | | .510 |
| 13 | 25/N | .833 | .581 | | .581 |
| 14 | 27/N | .900 | .615 | | .615 |
| 15 | 29/N | .967 | .827 | | .827 |

Although only a few exemplary embodiments of this invention have been explicitly described in the foregoing specification, it will be cearly understood by those skilled in the art that the broad concepts of the invention will have application in many hydrophone array constructions. Furthermore, those skilled in the art will readily appreciate that obvious modifications may be made in the exemplary embodiments without materi-

What is claimed is:

1. A linear signal receiving array of grouped transducers comprising a plurality of substantially co-linear spaced-apart array elements adapted to respond to incident signals as a linear towed array in a liquid medium wherein each of said elements in the linear array itself comprises a group of substantially co-linear individual transducers forming a second linear array within every element and wherein the second linear arrays within said elements are shaded to reduce their end-fire response characteristics with respect to locally generated tow noise propagating along and within the array at a velocity substantially less than the propagation velocity of said incident signals.

2. An array as in claim 1, wherein said transducers comprise hydrophones and the first-mentioned array is a linear array, adapted for towing in a liquid medium and wherein the second arrays are shaded to reduce response to noise signals caused by towing the array.

3. An array as in claim 1, wherein each shaded second array comprises a group of transducers with varying spacing therebetween.

4. An array as in claim 1, wherein each shaded second array comprises a group of transducers with varying effective sensitivities.

5. An array as in claim 1, wherein the second array of transducers comprising each element is shaded to minimize end-fire second array response to coherent noise signals propagating along the arrays.

6. A linear array of hydrophones adapted for towing in a liquid medium where coherent tow noise signals propagate along and within the array at a velocity substantially less than the propagation velocity of incident acoustic signals from the surrounding liquid medium, said array comprising:
   a linear array of hydrophone groups wherein each group of hydrophones is spaced with respect to other groups to function as one element of the linear array with respect to said higher velocity acoustic signals, and wherein each group of hydrophones itself comprises a linear array of individual hydrophones shaded to reduce the end-fire response of each group to said tow noise signals.

7. A linear array as in claim 6, wherein each group of hydrophones is shaded due to a predetermined spacing of the individual hydrophones therein.

8. A linear array as in claim 6 wherein each group of hydrophones is shaded due to predetermined effective sensitivites of the individual hydrophones therein.

9. A group of transducers adapted for inclusion as one element of a first phased linear array of such elements, each group being of sufficiently small physical dimensions and spaced with respect to other groups to respond as a single element with respect to high velocity signals of interest and each group further comprising a second phase array of individual transducers therein which are shaded to reduce its end-fire response to unwanted noise signals propagating along and within said first array at a substantially lower velocity than said high velocity signals of interest.

10. A group of transducers as in claim 9, wherein said transducers comprise hydrophones.

11. A group of transducers as in claim 9, wherein said second phased array is shaded due to a predetermined spacing of the individual transducers therein.

12. A group of transducers as in claim 9, wherein said second phase array is shaded due to predetermined effective sensitivities of the individual transducers therein.

13. A linear phased transducer array system for use in an environment where unwanted noise signals propagate along and within said array at a velocity substantially less than the propagation velocity of signals for which a response is desired, said system comprising:
   a first array of spaced apart elements for providing a plurality of phased output signals, and
   a phasing means connected to receive the plural phased output signals and combine them with predetermined phased relationships therebetween into a composite signal representing said signals for which a response is desired,
   each of said element means comprising a plurality of spaced apart individual transducers constituting a second linear array and wherein each said second arrays is shaded to reduce end-fire responses to the substantially lower velocity unwanted noise signals.

14. A system as in claim 13 wherein the first array is a towed linear hydrophone array and said transducers comprise hydrophones.

15. A system as in claim 14 wherein each second array is shaded due to a predetermined spacing of the individual hydrophones therein.

16. A system as in claim 14 wherein each second array is shaded due to predetermined effective sensitivities of the individual hydrophones therein.

17. A method of transducing desired acoustic signals with a linear array from a liquid medium and at the same time discriminating against substantially slower propagating noise signals within and along the array to thereby improve the signal-to-noise ratio, said method comprising the steps of:
   transducing acoustic signals to corresponding electrical signals at spaced apart intervals in said liquid medium, said spaced apart intervals defining a first linear array of spaced apart elements each of which elements itself comprises a spaced apart second linear array,
   shading the transducing intervals in each of said second arrays to discriminate against said substantially lower velocity noise signals,
   combining outputs from transducing intervals in each second array into a single element output signal,
   routing each element output signal to a central phasing means, and
   combining said element output signals with predetermined phase relationships therebetween within said phasing means to produce a composite output representing the desired higher velocity acoustic signals with an improved signal-to-noise ratio.

18. A method as in claim 17 wherein said shading step comprises variably spacing the transducing intervals in said second arrays.

19. A method as in claim 17 wherein said shading step comprises varying the effective sensitivities of hydrophone transducers situated at each transducing interval in said second arrays.

* * * * *